United States Patent [19]

Kinjo et al.

[11] Patent Number: 4,598,362
[45] Date of Patent: Jul. 1, 1986

[54] BUFFER APPARATUS FOR CONTROLLING ACCESS REQUESTS AMONG PLURAL MEMORIES AND PLURAL ACCESSING DEVICES

[75] Inventors: Morishige Kinjo; Jyun-ichi Kihara; Keizo Aoyagi, all of Tokyo, Japan

[73] Assignee: Tokyo Shibaura Denki Kabushiki Kaisha, Kawasaki, Japan

[21] Appl. No.: 506,363

[22] Filed: Jun. 21, 1983

[30] Foreign Application Priority Data

Jun. 24, 1982 [JP] Japan .................. 57-108812

[51] Int. Cl.⁴ .............................................. G06F 13/16
[52] U.S. Cl. ..................................................... 364/200
[58] Field of Search ... 364/200 MS File, 900 MS File

[56] References Cited

U.S. PATENT DOCUMENTS

| | | | |
|---|---|---|---|
| 4,096,567 | 6/1978 | Millard et al. | 364/200 |
| 4,177,510 | 12/1979 | Appell et al. | 364/200 |
| 4,297,743 | 10/1981 | Appell et al. | 364/200 |
| 4,393,445 | 7/1983 | Milligan et al. | 364/200 |
| 4,414,644 | 11/1983 | Tayler | 364/900 |
| 4,454,595 | 6/1984 | Cage | 364/900 |
| 4,456,970 | 6/1984 | Catiller et al. | 364/900 |
| 4,471,457 | 9/1984 | Videki, II | 364/900 |
| 4,482,982 | 11/1984 | Yu et al. | 364/900 |
| 4,494,190 | 1/1985 | Peters | 364/200 |

Primary Examiner—Harvey E. Springborn
Assistant Examiner—Archie E. Williams, Jr.
Attorney, Agent, or Firm—Kenyon & Kenyon

[57] ABSTRACT

A request buffer apparatus controls a plurality of access requests to devices to be accessed (e.g., memory banks) commonly used by a plurality of accessing devices (e.g., a CPU, channels, and DMA units) in a data processing system. The apparatus has a request buffer means which has a plurality of buffers for storing the access requests. Write/read operations of the requests in and from the request buffer means are randomly performed in accordance with the status of the device to be accessed corresponding to the request stored in the buffer. Requests corresponding to the same device to be accessed are written in the empty buffers of the request buffer means in the order they are generated, and are read out from the request buffer means in the order that they are written. Each device to be accessed has a buffer write address generating means, and the buffer write status of each buffer is indicated so as to obtain the next buffer write address.

13 Claims, 7 Drawing Figures

F I G. 5C
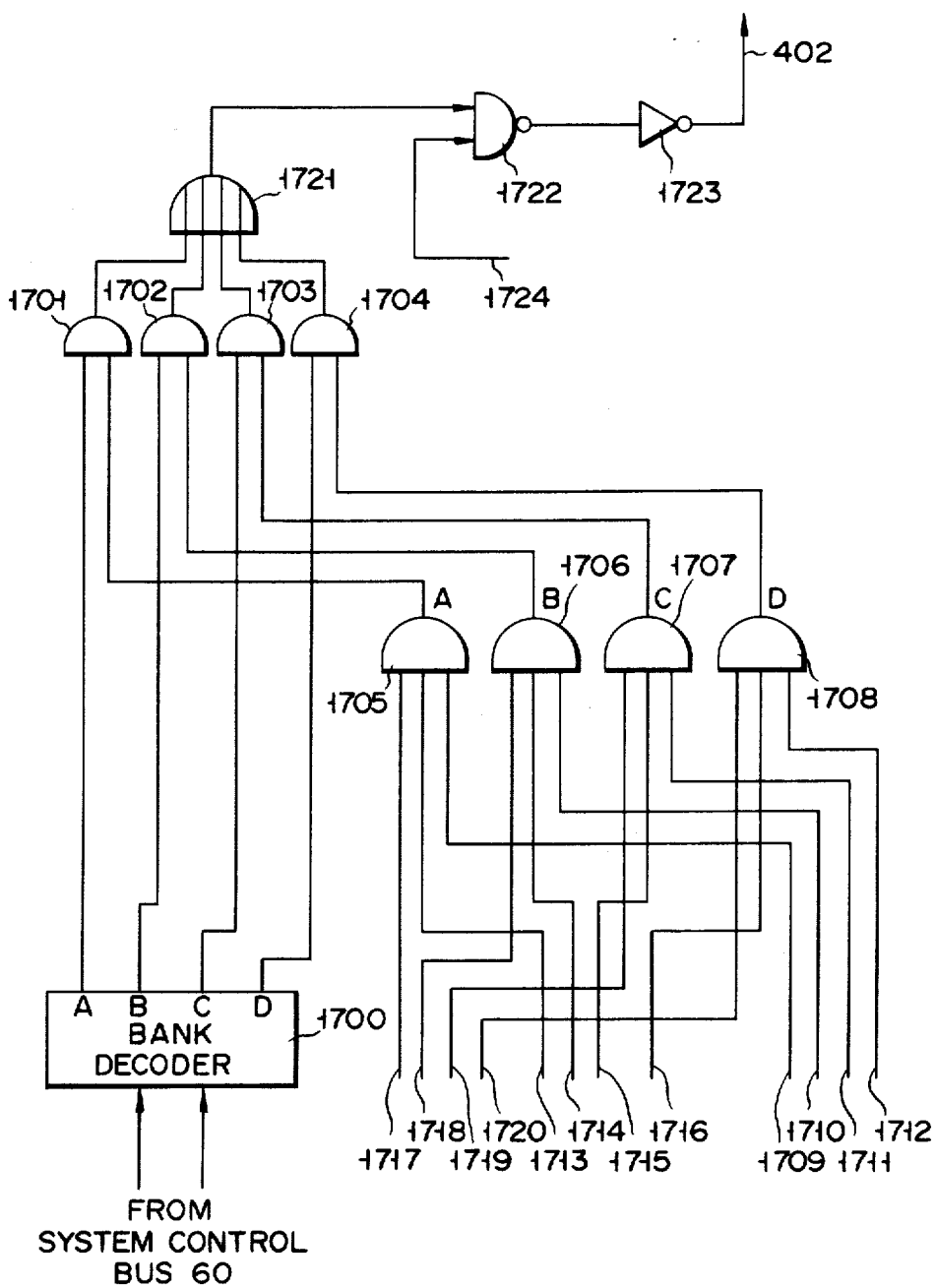

BUFFER APPARATUS FOR CONTROLLING ACCESS REQUESTS AMONG PLURAL MEMORIES AND PLURAL ACCESSING DEVICES

BACKGROUND OF THE INVENTION

The present invention relates to a request buffer apparatus which is adopted in a data processing system in which a plurality of independent devices (e.g., main memories) are commonly used for various pieces of equipment, and which controls requests from these various pieces of equipment.

A conventional request buffer apparatus of this type has a "First-In-First-Out" (FIFO) request buffer. Thus, requests (memory bank access requests) from the various pieces of equipment to a plurality of memory banks are stored in the request buffer in the order in which they are received. A control device of the request buffer monitors the ready/busy state of each memory bank. When a memory bank is ready (accessible), the control device determines if the first request stored in the request buffer is a request to this memory bank. If so, the first request is produced from the request buffer, thereby allowing accessing to the memory bank. On the other hand, if the memory bank is busy, the output of the initial request is withheld until the memory bank is ready. In this manner, in a conventional request buffer apparatus, requests from various pieces of equipment are produced in the order in which they are received when the corresponding memory banks are ready, thereby allowing accessing to the memory banks. For this reason, even if a memory bank corresponding to a request stored in the request buffer is ready, if another request to another memory bank which was received prior to the former request is also stored in the request buffer, execution (memory bank access) of the former request is withheld. As a result of this, in the conventional system, the waiting time within the request buffer becomes long, and this lowers the overall processing speed.

Meanwhile, it is also known to arrange a plurality of request buffers in correspondence with a plurality of memory banks, such that each request buffer stores only requests to the corresponding memory bank. However, although the problem of a low processing speed as described is solved, the amount of hardware inevitably increases.

SUMMARY OF THE INVENTION

It is an object of the present invention to provide a request buffer apparatus for a data processing system in which a plurality of memory banks are commonly used by a plurality of input/output devices or microprocessors, wherein the waiting time of a request in a request buffer is reduced to the minimum while a high data processing speed is obtained with a smaller amount of hardware.

A further object of the present invention is to provide a request buffer apparatus which is capable of randomly writing access requests into and reading them from a plurality of buffer memories of a request buffer.

A still further object of the present invention is to provide a request buffer apparatus which is capable of immediately outputting an access request if conditions for writing the access request in the request buffer are not established.

Another object of the present invention is to provide a request buffer apparatus which controls the read/-write operation of a plurality of access requests to the same memory bank into or from the request buffer in accordance with the FIFO (First-In-First-Out) control method.

In order to provide a request buffer apparatus which satisfies the above objects, according to the present invention, a latch register is incorporated which latches an access request from an accessing device. The access request from the latch register is stored in a request buffer means having a plurality of buffers. A write control means provides the address of an empty buffer of the request buffer means, and the access request from the latch register is written in the empty buffer. When the write control means writes k access requests (where k is an integer greater than 1 and is the number of buffers) for accessing the same device in the buffer of the request buffer, a buffer read address generating means sequentially saves the write buffer addresses and produces them as buffer read addresses in the order in which they were saved. Accordingly, when the device to be accessed is ready, the access requests written in the buffers of the request buffer are read out by a read control means in accordance with the read addresses from the buffer read address generating means. If a request to a ready device is latched in the latch register and if another request to the same device is not stored in the request buffer means, the request latched in the latch register is immediately supplied to the device to be accessed by output means.

BRIEF DESCRIPTION OF THE DRAWINGS

FIG. 5 shows the detailed configuration of a control circuit of the request buffer apparatus according to the present invention, in which FIG. 5C is a detailed block diagram of a circuit for generating a control signal.

DETAILED DESCRIPTION OF THE PREFERRED EMBODIMENT

Figure 1:
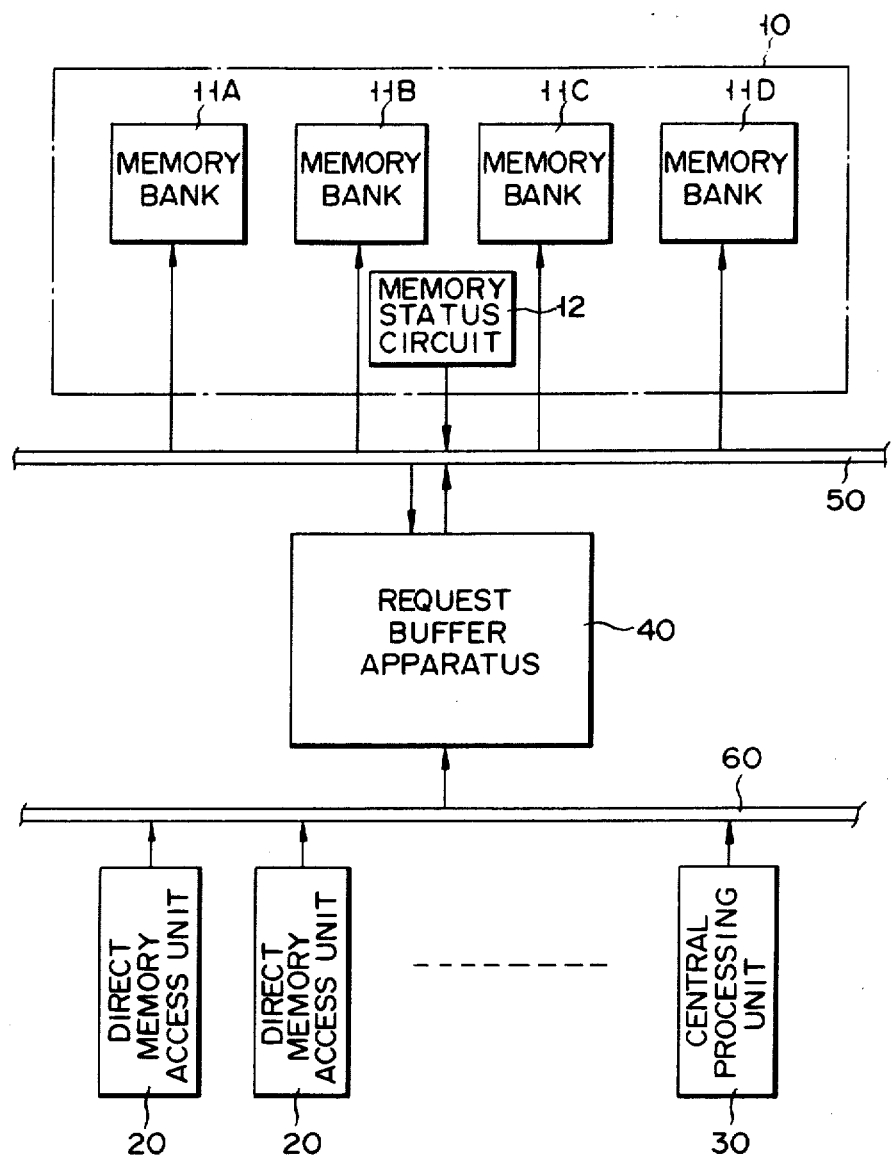
FIG. 1 is a block diagram showing the overall configuration of a data processing system having a request buffer apparatus according to the present invention.

The preferred embodiment of the present invention will now be described with reference to the accompanying drawings. FIG. 1 shows the configuration of a data processing system having a request buffer apparatus according to the preferred embodiment of the present invention. Referring to FIG. 1, a main memory 10 has, for example, four memory banks 11A to 11D. A memory status circuit 12 indicates the status, for example, the ready/busy status of the respective memory banks 11A to 11D. Direct memory access (DMA) units 20 and a central processing unit (CPU) 30 are connected to a request buffer apparatus 40 through a system control bus 60. The CPU 30 commonly uses the memory banks 11A to 11D of the main memory 10. The request buffer apparatus 40 controls bank access requests to these memory banks 11A to 11D from the DMA units 20 and the CPU 30. The respective memory banks 11A to 11D are connected to the request buffer apparatus 40 through a memory bus 50.

Figure 2:
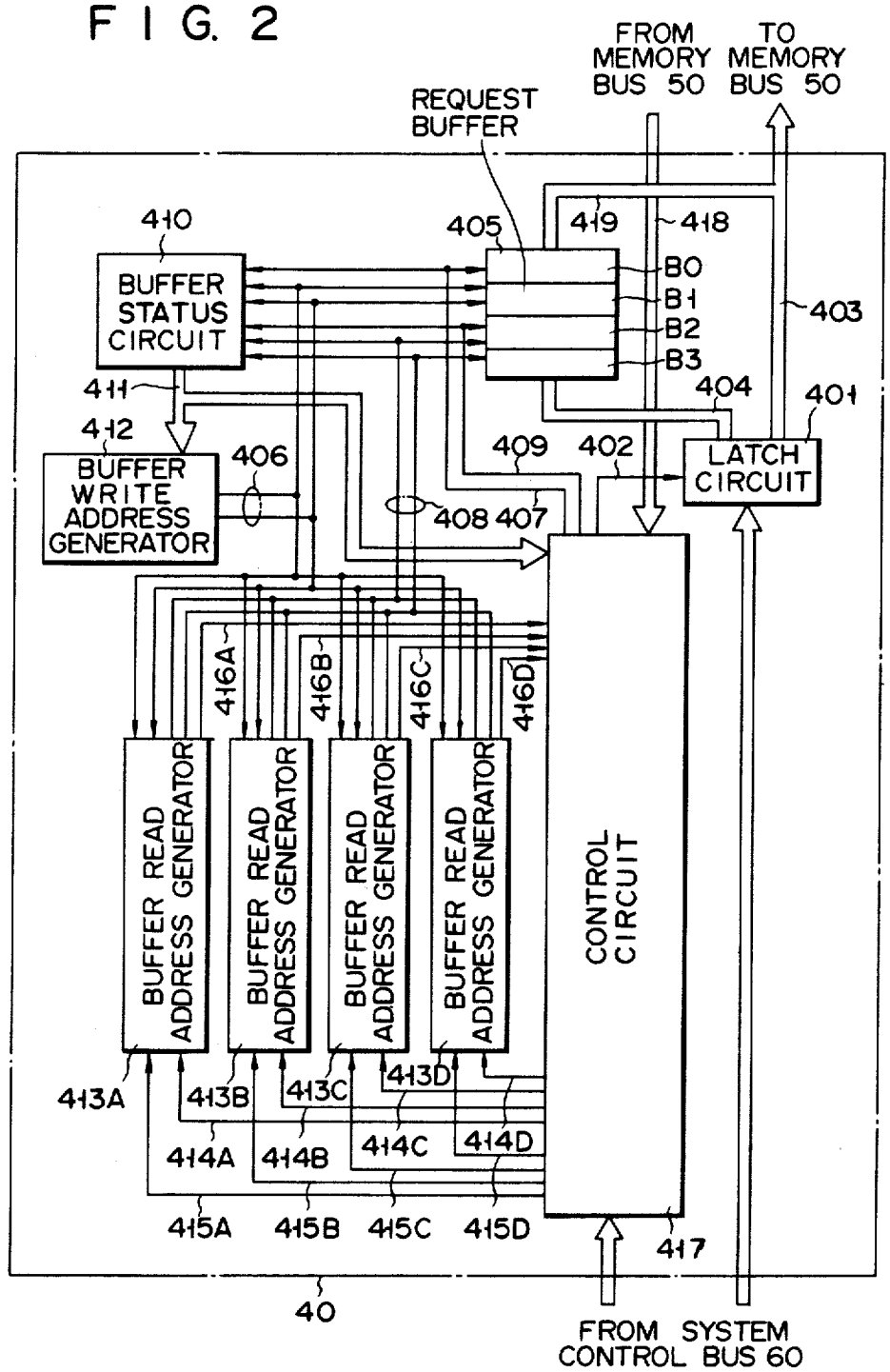
FIG. 2 is a block diagram showing the schematic configuration of the request buffer apparatus according to the present invention.

FIG. 2 is a view showing the internal configuration of the request buffer apparatus 40. A latch circuit 401 latches a memory address as a bank access request which is supplied through the system control bus 60. In response to a control signal 402 from a control circuit 417, the latch circuit 401 produces a bank access request (memory address) to either of data lines 403 and 404. A request buffer 405 comprises a random-access memory (RAM) consisting of four buffers B0 to B3, for example, which store the bank access request supplied through the data line 404. A bank access request is written in the request buffer 405 in accordance with a buffer write address 406 from a buffer write address generator 412 and a write enable signal 407 from the control circuit 417. Readout of the bank access request from the request buffer 405 is performed in accordance with a buffer read address 408 from buffer read address generators 413A to 413D and a read enable signal 409 from the control circuit 417.

A buffer status circuit 410 indicates the empty status of the buffers B0 to B3. The buffer status circuit 410 receives the buffer write address 406, the write enable signal 407, the buffer read address 408, and the read enable signal 409. Status data provided by the buffer status circuit 410 (presence/absence of an empty buffer among the buffers B0 to B3) is supplied to the buffer write address generator 412 through a buffer status line 411. The buffer write address generator 412 selects a desired one of empty buffers Bi (i=0 to 3) in which data may be written, in accordance with the status data supplied through the buffer status line 411. Then, the buffer write address generator 412 supplies the buffer address of the selected buffer to the request buffer 405 and to the buffer read address generators 413A to 413D as a buffer write address (buffer address for writing) 406 to the request buffer 405 and the buffer read address generators 413A to 413D.

The buffer read address generators 413A to 413D respectively correspond to the memory banks 11A to 11D. The buffer read address generators 413A to 413D commonly receive the buffer write address 406 from the buffer write address generator 412. The buffer read address generators 413A to 413D also receive corresponding write request signals 414A to 414D and read request signals 415A to 415D from the control circuit 417. The buffer read address generator 413$i$ (i=A to D) has the function of counting the number of requests to a corresponding memory bank 11$i$ (i=A to D) waiting in the the request buffer 405. The buffer read address generator 413$i$ increments its count by one in response to each write request signal 414$i$ (i=A to D) and decrements its count in response to each read request signal 415$i$. The buffer read address generator 413$i$ also has a function of storing the address of the destination buffer for storing the request to the memory bank 11$i$ to be accessed which request is waiting in the request buffer 405. In response to the read request signal 415$i$, the buffer read address generator 413$i$ supplies the destination buffer address of the waiting bank access request, which was received first, to the request buffer 405 and the buffer status circuit 410 as a buffer read address 408.

The counts of the buffer read address generators 413A to 413D are supplied to the control circuit 417 through status lines 416A to 416D, respectively.

The control circuit 417 receives memory bank identification data representing which bank is to be accessed when a bank access request is made, data representing if the access is a memory read access or a memory write access, and so on, through the system control bus 60. The control circuit 417 also receives status data from the memory status circuit 12 through the memory bus 50 and a status line 418. The status data from the buffer status circuit 410 is supplied to the control circuit 417 through the status line 411, while the counts from the buffer read address generators 413A to 413D are supplied to the control circuit 417 through the status lines 416A to 416D, respectively. Based on these input data, the control circuit 417 determines the output of the control signal 402, the write enable signal 407, the read enable signal 409, the write request signals 414A to 414D, and the read request signals 415A to 415D. A readout signal from the request buffer 405 is transferred onto the data line 403 via the driver of the data line 419.

Figure 3:
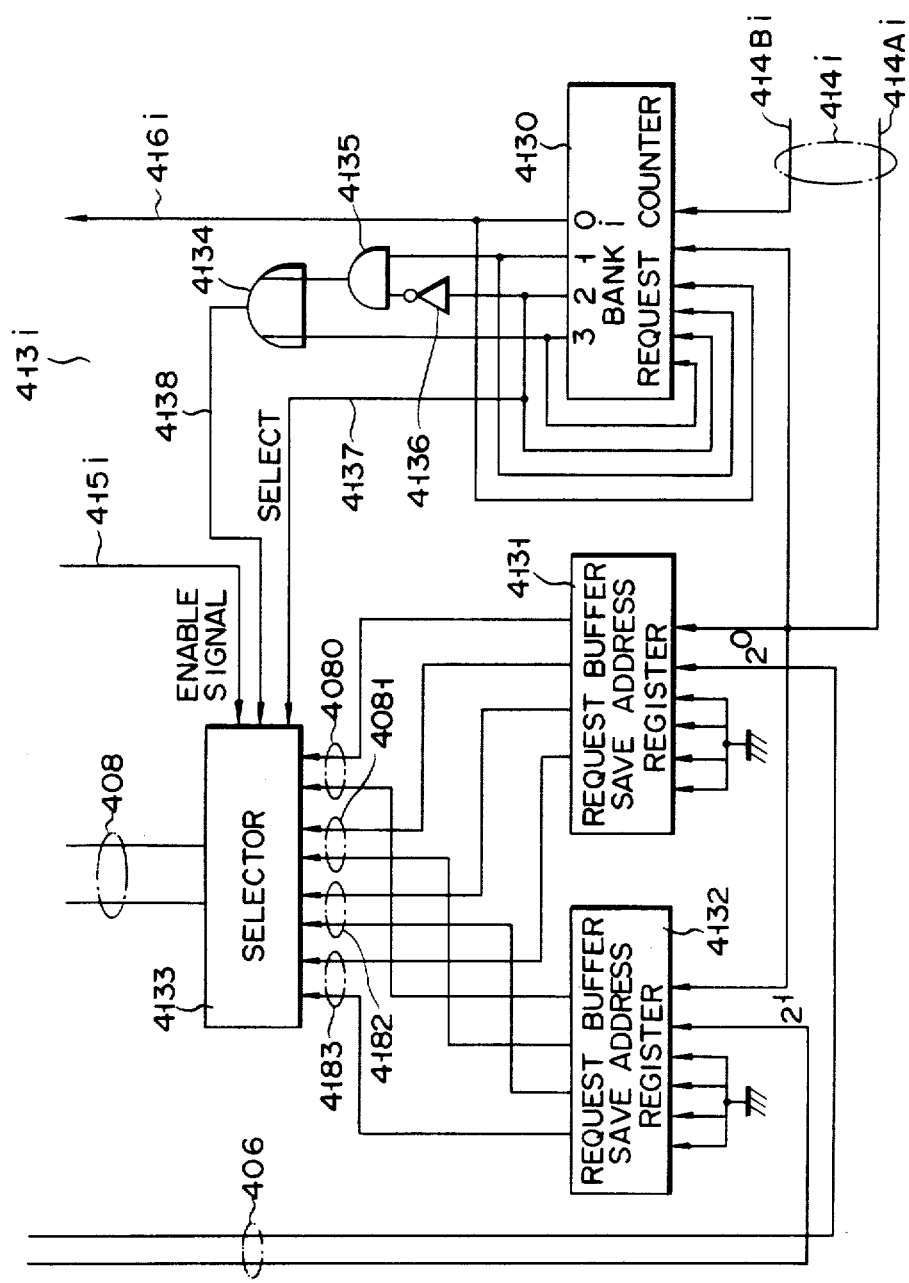
FIG. 3 is a view showing the detailed configuration of a read address generator of the request buffer apparatus according to the present invention.

FIG. 3 is a block diagram showing the detailed configuration of each buffer read address generator 413$i$ (i=A to D). The buffer read address generators 413$i$ are arranged in correspondence with the respective memory banks 11$i$ (i=A to D). The buffer read address generator 413$i$ comprises a bank i request counter 4130, request buffer save address registers 4131 and 4132, a selector 4133, an OR gate 4134, an AND gate 4135, and an inverter 4136.

Figure 4:
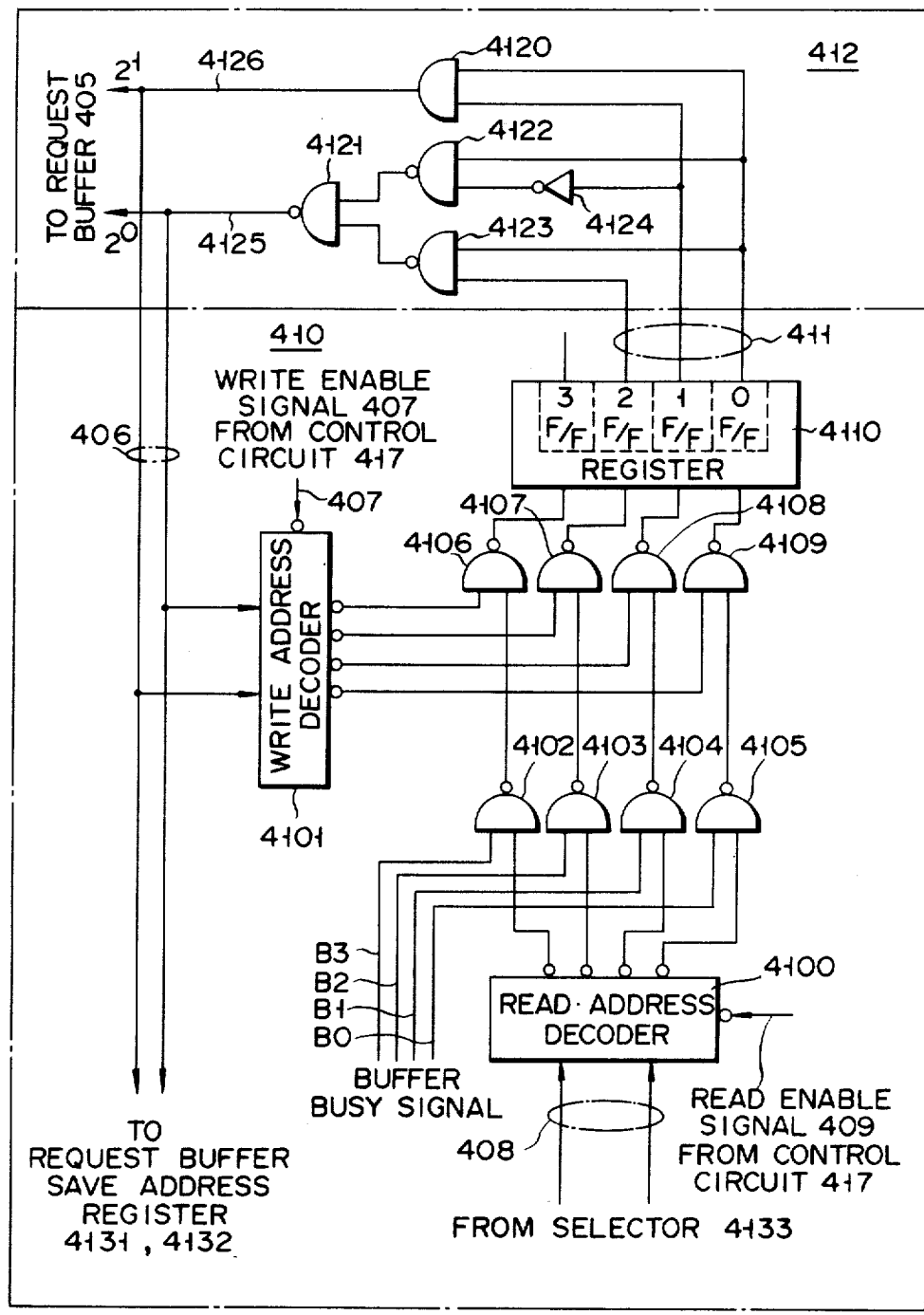
FIG. 4 is a view showing the detailed configuration of a buffer status circuit and a write address generator of the request buffer apparatus of the present invention.

FIG. 4 is a block diagram showing the detailed configuration of the buffer status circuit 410 and the buffer write address generator 412. The buffer status circuit 410 comprises a read address decoder 4100, a write address decoder 4101, NAND gates 4102 to 4105 and 4106 to 4109, and a 4-bit register 4110 (four flip-flops). The four flip-flops constituting the register 4110 are arranged in correspondence with the buffers B0 to B3 of the request buffer 405. The buffer write address generator 412 comprises an AND gate 4120, NAND gates 4121, 4122 and 4123, and an inverter 4124.

Figure 5A:
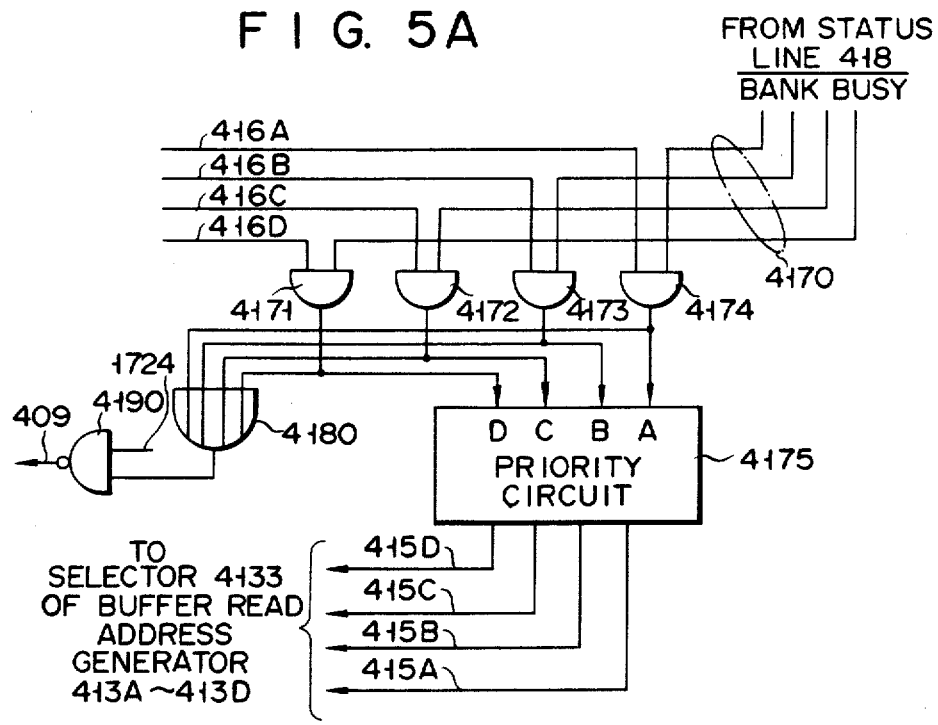
FIG. 5A is a detailed block diagram of a circuit for generating a read request signal as well as a read enable signal.

FIG. 5 shows a circuit portion of the control circuit 417 which is directly related to the present invention. FIG. 5A shows a circuit for generating the read request signals 415A to 415D and the read enable signal 409. AND gates 4171 to 4174 of this circuit receive the status data (signals representing the presence of bank access requests) on the status lines 416A to 416D from the bank i (i=A to D) request counter 4130 shown in FIG. 3, and memory status data (inverted signals of bank busy signals) 4170 representing which of the memory banks 11A to 11D is accessible. The output signals from the AND gates 4171 to 4174 are supplied to a priority circuit 4175 to determine their priority. Output signals, i.e., read request signals 415A to 415D from the priority circuit 4175 are supplied to the selectors 4133 of the buffer read address generators 413A to 413D. In this manner, it is determined which one of the bank access requests corresponding to the memory banks which are stored in the request buffer 405 is to be read out therefrom. The read enable signal 409 is prepared by the AND gates 4171 to 4174 through an OR gate 4180 and a NAND gate 4190 and is supplied to the request buffer 405 and the buffer status circuit 410.

Figure 5B:
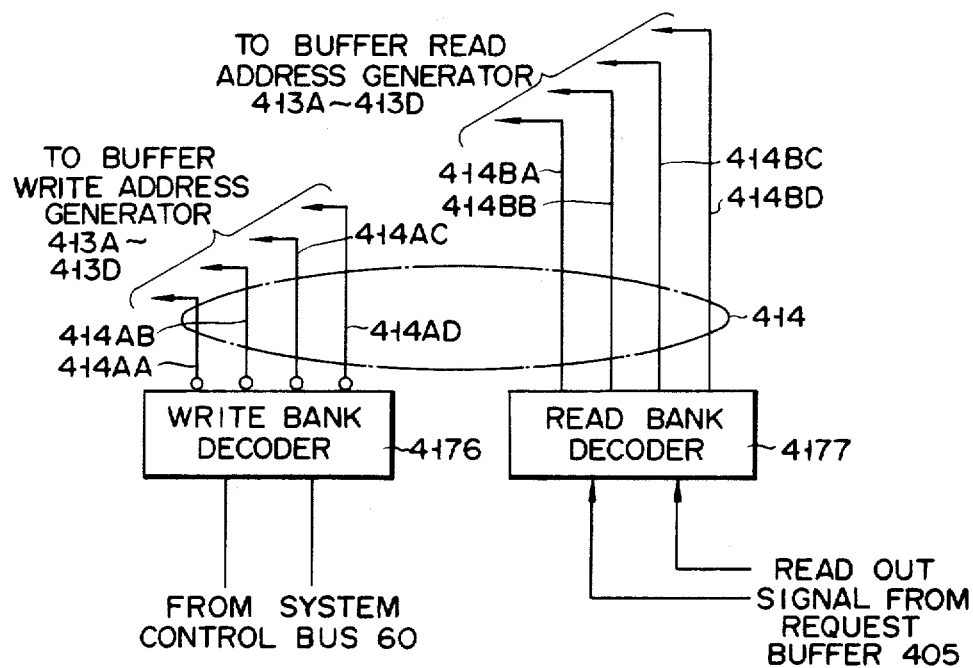
FIG. 5B is a detailed block diagram of a circuit for generating a write request signal.

FIG. 5B shows a circuit for generating the write request signals 4]4A to 4]4D. A write bank decoder 4176 decodes bank address data of, for example, 2 bits included in the memory request data transmitted through the system control bus 60, and supplies a signal 414Ai for incrementing by one the bank i request counter 4130 shown in FIG. 3 of the corresponding memory bank 11i. A read bank decoder 4177 decodes the bank address data of, for example, 2 bits included in the read data (bank access request) from the request buffer 405 and supplies a signal 414Bi for decrementing by one the bank i request counter 4130 shown in FIG. 3 of the corresponding memory bank 11i. An output signal from the write bank decoder 4176 is also supplied to the request buffer save address registers 4131 and 4132 of each buffer read address generator 413i so as to enable them. Accordingly, the output signals from the write bank decoder 4176 and the read bank decoder 4177 are paired for each corresponding one of the buffer read address generators 413A to 413D (414AA and 414BA, 414AB and 414BB, 414AC and 414BC, and 414AD and 414BD) so as to prepare the read request signals 415A to 415D.

FIG. 5C shows a circuit for generating the control signal 402. The bank identification data included in the bank access request (memory address) transferred through the system control bus 60 is supplied to a bank decoder 1700, and a decoded output signal from which is supplied to one input terminal of each of AND gates 1701 to 1704. The other input terminal of each of the AND gates 1701 to 1704 receives an output signal from each of AND gates 1705 to 1708. Each of the AND gates 1705 to 1708 produces an output signal of logic level "1" when the three input signals satisfy the AND conditions. The first input signals to these AND gates 1705 to 1708 are ready signals 1709 to 1712 (inverted signals 4170 of the bank busy signals) of the memory banks i (i=A to D). The second input signals to these AND gates 1705 to 1708 are signals 1713 to 1716 which represent that the banks i (i=A to D) are not in the refresh process. The third input signals to these AND gates 1705 to 1708 are signals 1717 to 1720 which indicate to the request buffer 405 that there is no bank request to the corresponding banks i (i=A to D). The signals 1717 to 1720 may be obtained from status signals 416i (i=A to D) from the bank i (i=A to D) request counter 4130. The output signals from the AND gates 1701 to 1704 are passed through an OR gate 1721 and a NAND gate 1722, and inverted by an inverter 1723. The inverted signal from the inverter 1723 is supplied to the latch circuit 401 as the control signal 402. An input signal 1724 to the NAND gate 1722 has logic level "1" when there is no bank contention.

The mode of operation of the apparatus of the embodiment of the present invention will now be described. When a DMA unit 20 or the CPU 30 generates a bank access request to one of the memory banks 11A to 11D, this access request (memory address) is transferred to the request buffer apparatus 40 through the system control bus 60 and is then latched by the latch circuit 401. The bank identification data indicating the destination memory bank of this bank access request is also transferred to the request buffer apparatus 40 through the system control bus 60 and is supplied to the control circuit 417. Meanwhile, the control circuit 417 receives the status data from the memory status circuit 12, that is, the signals representing ready/busy status of the memory banks 11A to 11D, through the memory bus 50 and the status line 418. When the control circuit 417 determines that the destination memory bank of the bank access request (memory address) latched in the latch circuit 401 is busy in accordance with the status data on the status line 418, it causes this bank access request to wait in the request buffer 405 or the latch circuit 401. Whether the bank access request waits in the request buffer 405 or in the latch circuit 401 is determined in accordance with the status data from the buffer status circuit 410, that is, the data representing the presence or absence of an empty buffer among the buffers B0 to B3 in the request buffer 405. In this manner, when the control circuit 417 determines that there is no empty buffer among the buffers B0 to B3 in accordance with the status data (on the buffer status line 411) from the buffer status circuit 410, it causes the bank access request latched in the latch circuit 401 to wait there.

On the other hand, if at least one of the buffers B0 to B3 of the request buffer 405 is empty, the control circuit 417 determines that data may be written in the request buffer 405. Then, the control circuit 417 reads out the bank access request latched in the latch circuit 401 and writes it into the empty buffer Bi of the request buffer 405. More specifically, the control circuit 417 supplies a control signal 402 to the latch circuit 401 upon which the latch circuit 401 produces the bank access request onto the data line 404. Then, the bank access request is supplied to the request buffer 405.

Subsequently, the control circuit 417 supplies a write request signal 414Ai to the buffer read address generator 413i corresponding to the destination memory bank 11i. When the bank access request is confirmed to correspond to the memory bank 11A based upon the decoded result of the write bank decoder 4176, the decoder 4176 supplies a write request signal 414Ai to the bank A request counter 4130 and the request buffer save address registers 4131 and 4132 of the buffer read address generator 413A. Then, the bank A request counter 4130 of the buffer read address generator 413A increments its count by one in response to this write request signal 414Ai. This indicates that there is one bank access request to the memory bank 11A, which is waiting in the request buffer 405. The buffer write address 406 (i.e., the buffer address of the request buffer 405 for storing the bank access request in question) produced from the buffer write address generator 412 in response to the write request signal 414Ai is stored in the request buffer save address registers 4131 and 4132 of the buffer read address generator 413A. Meanwhile, the control circuit 417 supplies the write enable signal 407 to the request buffer 405. The request buffer 405 also receives the buffer write address 406 from the buffer write address generator 412. When the contents of the buffer write address 406 are, for example, "10", the bank access request on the data line 404 is stored in the buffer B2 of the request buffer 405 in accordance with the write enable signal 407.

The write enable signal 407 from the control circuit 417 is also supplied to the write address decoder 4101 of the buffer status circuit 410. The write address decoder 4101 also receives the buffer write address 406 generated by the buffer write address generator 412 in response to the write enable signal 407. Then, the decoder 4101 decodes the buffer write address 406. The output signal from the NAND gate 4107 alone goes to logic level "1", and the flip-flop (F/F2) of the register 4110 corresponding to the write-accessed buffer B2 is set. This indicates that the bank access request is stored in the buffer B2 of the request buffer 405, that is, the buffer B2 is not empty and a new bank access request can not be stored in this buffer B2. The buffer status circuit 410 signals to the buffer write address generator 412 and to the control circuit 417 the presence or absence of an empty buffer among the buffers B0 to B3 of the request buffer 405. In accordance with the presence/absence of an empty buffer among the buffers B0 to B3 indicated by the register 4110 of the buffer status circuit 410, the buffer write address generator 412 selects one empty buffer and supplies the address of the selected empty buffer as a next buffer write address 406. The address generation logic of the buffer write address generator 412 shown in FIG. 4 is shown in Table I below:

TABLE I

| Buffer busy | | | | Buffer write address | |
|---|---|---|---|---|---|
| B0 | B1 | B2 | B3 | Signal 4126 | Signal 4125 |
| 0 | 0 | 0 | 0 | 0 | 0 |
| 0 | 0 | 0 | 1 | 0 | 0 |
| 0 | 0 | 1 | 0 | 0 | 0 |
| 0 | 0 | 1 | 1 | 0 | 0 |
| 0 | 1 | 0 | 0 | 0 | 0 |
| 0 | 1 | 0 | 1 | 0 | 0 |
| 0 | 1 | 1 | 0 | 0 | 0 |
| 0 | 1 | 1 | 1 | 0 | 0 |
| 1 | 0 | 0 | 0 | 0 | 1 |
| 1 | 0 | 0 | 1 | 0 | 1 |
| 1 | 0 | 1 | 0 | 0 | 1 |
| 1 | 0 | 1 | 1 | 0 | 1 |
| 1 | 1 | 0 | 0 | 1 | 0 |
| 1 | 1 | 0 | 1 | 1 | 0 |
| 1 | 1 | 1 | 0 | 1 | 1 |

Note: "1" represents the busy status.

As may be seen from Table I above, if the buffer B0 is not busy, a buffer write address is generated such that the bank access request is stored in the buffer B0. This means that the bank access request is stored in the empty buffers in the order of buffers B0→B1→B2→B3.

A case will now be described wherein the destination memory bank (e.g., the memory bank 11A) of the bank access request latched in the latch circuit 401 is ready. The control circuit 417 determines if another bank access request corresponding to the memory bank 11A is waiting in the request buffer 405. For example, when an access request to the memory bank 11A is generated, a signal of logic level "1" is supplied from the bank decoder 1700 to the AND gate 1701. If the three conditions (the bank 11A is ready, the bank 11A is not in the process of refresh, and another bank access request to the bank 11A is not stored in the request buffer 405) are satisfied, the output from the AND gate 1705 goes to logic level "1". Then, a signal of logic level "1" is produced from the AND gate 1701, and a control signal 402 of logic level "1" is produced through the OR gate 1721, the NAND gate 1722, and the inverter 1723.

Whether or not a bank access request corresponding to the bank 11A is stored in the request buffer 405 may be discriminated in accordance with the logic level of the data on the status line 416A of the bank A request counter 4130 of the buffer read address generator 413A. Thus, if the output signal from the counter 4130 is at logic level "0", the corresponding buffer access request is not stored in the request buffer 405. When the control signal 402 is supplied to the latch circuit 401 from the control circuit 417, the bank access request latched in the latch circuit 401 is produced onto the data line 403. In this manner, this bank access request is transferred onto the memory bus 50 within a short period of time from the time it is generated, allowing a quick access to the memory bank 11A.

On the other hand, if the output signal 416A from the counter 413 is not at logic level "0", it means that there is at least one bank access request which corresponds to the bank 11A and which is stored in the request buffer 405. Such a bank access request is read out from the request buffer 405 when the memory bank 11A is ready. When a bank access request is stored in the request buffer 405, the corresponding bank i request counter 4130 is counted up by one, and the status line 416i goes to logic level "1". When an access request to the memory bank 11A, for example, is written in an empty buffer of the request buffer 405, the status line 416A of the bank A request counter 4130 goes to logic level "1". The signal on the status line 416A is supplied to one input terminal of the AND gate 4174 of the control circuit 417 shown in FIG. 5A, and the other input terminal of the AND gate 4174 receives a ready signal (inverted signal of the busy signal) of the bank 11A. Then, an output signal of logic level "1" from the AND gate 4174 is supplied to the priority circuit 4175 and the OR gate 4180. An output signal from the OR gate 4180 is supplied to the NAND gate 4190 and is AND processed with a signal 1724 of logic level "1" indicating no bank contention. Then, a read enable signal 409 is produced from the NAND gate 4190 and is supplied to the request buffer 405 and the buffer status circuit 410. On the basis of the output signals from the AND gates 4171 to 4174, the priority circuit 4175 performs predetermined priority control and produces a selected one of the read request signals 415A to 415D as a signal of logic level "1". When readout of the bank access request to the memory bank 11A, for example, is enabled, the read request signal 415A from the priority circuit 4175 goes to logic level "1". This signal 415A is supplied as an enable signal to the selector 4133 of the buffer read address generator 413A. In response to the signal 415A, the selection operation of the selector 4133 of the buffer read address generator 413A is enabled. At this time, the selecting position of the selector 4133 is set by a second bit signal 4137 from the bank i (in this case, i=A) request counter 4130 and an output signal 4138 from the OR gate 4134.

The request buffer save address registers 4131 and 4132 in each of the buffer read address generators 413A to 413D will now be described. These registers 4131 and 4132 may comprise, for example, "4-bit bidirectional universal shift registers" SN54S 194 available from Texas Instruments Corp. Each of these registers 4131 and 4132 has a 4-bit flip-flop. The register 4131 stores the $2^0$th bit of the buffer write address 406, while the register 4132 stores the $2^1$th bit of the buffer write address 406. The contents of these flip-flops are shifted by one bit to the more significant bits every time a buffer write request signal 414Ai is received, and the most recent buffer write address is stored at the LSBs. Thus, the corresponding bit positions of the 4-bit output signals from the registers 4131 and 4132 are paired to provide buffer read addresses 4080 to 4183. The selector 4133 selects one of the buffer read addresses 4080 and 4183. The registers 4131 and 4132 can save a maximum of four buffer addresses of the bank access requests stored in the request buffer 405. If one bank access request to the memory bank 11A is stored in the buffer B2 of the request buffer 405, the buffer read address 4080 from the registers 4131 and 4132 is "10". If two bank access requests to the memory bank 11A are stored in the buffers B1 and B3 of the request buffer 405, the buffer read addresses 4081 and 4080 from the registers 4131 and 4132, respectively, are "01" and "11".

The number of bank access requests to the memory bank 11i (i=A to D) stored in the request buffer 405 is counted by the bank i request counter 4130. The counter 413 is incremented by one in response to a write request signal 414Ai from the write bank decoder 4176 and is decremented by one in response to a write request signal 414Bi from the read bank decoder 4177. Since the contents of the registers 4131 and 4132 are shifted by one bit to the more significant bits every time a buffer write address 406 is saved, the counter 4130 is incremented by one in response to each write request signal 414Ai so that the select position signal of the selector 4133 may be updated in accordance with the shifted positions of the registers 4131 and 4132. Since the registers 4131 and 4132 save the buffer write address 406 after shifting its bit positions to the more significant bits, the counter 4130 is decremented by one in response to each write request signal 414Bi, so that the select position signal of the selector 4133 may be updated in the reverse direction to the shift operation of the registers 4131 and 4132 every time a bank access request is read out. For example, when three access requests to the bank 11A are stored in the buffers B0 to B2, respectively, of the request buffer 405, the selector 4133 selects a buffer read address 4082 (logic value "00") in accordance with a selection signal 4137 from the counter 4130 (output logic value "0100") and a selection signal 4138 (logic value "00") received through the AND gate 4135, the OR gate 4134 and the inverter 4136. An access request is read out from the buffer B0 of the request buffer 405, which is accessed by this selected buffer read address 408. The bank identification data included in the readout access request is supplied to the read bank decoder 4177, which then produces a write request signal 414BA as a decoded signal. In response to the write request signal 414BA, the counter 4130 is decremented by one to "0010". This means that two more access requests are stored in the request buffer 405. Then, the logic value of the selection signals 4137 and 4138 obtained by the count of this counter 4130 becomes "01" to select the buffer read address 4081. A buffer read address designating the buffer B1 may then be selected.

The buffer read address 408 from the selector 4133 is supplied to the read address decoder 4100 in addition to the request buffer 405. If the buffer read address 408 is a signal (logic value "01") representing the buffer B0, a signal of logic level "0" is produced through the NAND gates 4104 and 4108 by the decoded output from the decoder 4100. Then, the flip-flop (F/F1) of the register 4110 corresponding to the buffer B0 is reset. This indicates that a bank access request is not stored in the buffer B1, that is, the buffer B1 is empty and a new bank access request may be stored therein.

In summary, the request buffer apparatus of the present invention has the following characteristics.

First, bank access requests are randomly written in and read out from the request buffer 405. Initially, bank access requests are stored in the buffers B0 to B3 of the request buffer 405 in the order in which they are received. However, as the time elapses, depending upon the ready/busy status of the corresponding memory banks, a most recently stored request may be read out first. Alternatively, a bank access request which was written first may be read out first.

Second, if the memory bank 11i corresponding to the access request is ready and if a memory access request to this memory bank 11i is not stored in the request buffer 405, the access request is immediately produced as a memory access request to this memory bank 11i and processed at high speed without intervention of the request buffer 405.

Third, the read address generated by the buffer read address generator 413i is controlled so that a bank access request which was stored first in the request buffer 405 is read out. Note that the bank access requests here are a plurality of requests corresponding to the same memory banks 11i. In other words, the write addresses saved in the registers 4131 and 4132 are selectively produced from the selector in the order they are saved. Thus, the buffer read address generator 413i performs FIFO control.

The above embodiment has been described with reference to a case wherein four memory banks are used and the request buffer apparatus has four buffers. However, the present invention is not limited to this. Furthermore, the above embodiment is described with reference to a case wherein the present invention is applied to a system in which various pieces of equipment commonly use a plurality of memory banks. However, the present invention may be applied to any system which commonly uses a plurality of independent processing circuits.

What is claimed is:

1. A request buffer apparatus for controlling a plurality of access requests which designate a plurality of devices to be accessed, in a data processing system in which said devices to be accessed are shared among a plurality of access devices, comprising:

latch register means for latching said access requests from said access devices;

request buffer means having k buffers (k>1), coupled to said latch register means, for storing said access requests from said latch register;

write control means, coupled to said request buffer means, for monitoring a state of said buffers in said request buffer means to determine addresses of empty buffers, and for writing said access requests, which are latched by said latch register means, in addresses of said empty buffers;

buffer read address generating means, coupled to said request buffer means and to said write control means, for sequentially storing written buffer addresses when k access requests which designate a same device to be accessed are written in said buffers in said request buffer means by said write control means, and for generating, as buffer read addresses, said written buffer addresses in an order stored;

read control means, coupled to said request buffer means and to said buffer read address generating means, for reading access requests, which are written in said buffers in said request buffer means, based on read addresses supplied by said buffer read address generating means when a device to be accessed is ready to receive access requests;

direct data line means, adapted to be coupled between said latch register means and said devices to be accessed, for directly connecting said latch register means with each of said devices to be accessed; and, direct output means, coupled to said latch register means and to said direct data line means, for directly supplying an access request, which is newly latched in said latch register means, through said direct data line means to a device to be accessed, as designated by said newly latched access request, when no access request designating said device designated by said newly latched access request is stored in said request buffer means when said device designated for accessing by said newly latched access request is ready to receive an access request.

2. An apparatus as in claim 1 wherein said write control means comprises buffer status circuit means, coupled to said request buffer means, for indicating an empty status of said k buffers; and, buffer write address generating means, coupled to said buffer status circuit means, for generating a buffer write address for writing an access request which is received next, in accordance with an output signal from said buffer status circuit means.

3. An apparatus as in claim 2, wherein said buffer status circuit means comprises a plurality of flip-flops which correspond, respectively, to said k buffers, said plurality of flip-flops being set by a decoded signal of a buffer write address and being reset by a decoded signal of a buffer read address.

4. An apparatus as in claim 3 wherein said buffer read address generating means comprises counting means for counting a number of access requests to said devices to be accessed which are written in said request buffer means; and, buffer write address saving means, coupled to said buffer write address generating means, for shifting and saving buffer write addresses supplied to said request buffer means from said buffer write address generating means in accordance with a write operation of each request in said request buffer means.

5. An apparatus as in claim 4, wherein said counting means is incremented in response to a write request signal to said request buffer means for writing an access request to said device to be accessed and is decremented in response to a read request signal to said request buffer means for reading out a request from said device to be accessed.

6. An apparatus as in claim 4, wherein an output signal from said buffer write address saving means is selected by a selection signal from said counting means so as to obtain a buffer read address.

7. An apparatus as in claim 2, wherein said buffer write address generating means generates a smallest buffer write address among buffer write addresses that correspond to empty buffers when said buffer status circuit means indicates that a plurality of said buffers are in an empty state.

8. An apparatus as in claim 1, wherein said buffer read address generating means is provided for each of said plurality of devices to be accessed.

9. An apparatus as in claim 1, wherein said buffer read address generating means comprises counting means for counting a number of access requests to said devices to be accessed which are written in said request buffer means; and, buffer write address saving means, coupled to said buffer write address generating means, for shifting and saving buffer write addresses supplied to said request buffer means from said buffer write address generating means in accordance with a write operation of each request in said request buffer means.

10. An apparatus as in claim 9, wherein said counting means is incremented in response to a write request signal to said request buffer means for writing an access request to said device to be accessed, and is decremented in response to a read request signal to said request buffer means for reading out a request from said device to be accessed.

11. An apparatus as in claim 9, wherein an output signal from said buffer write address saving means is selected by a selection signal from said counting means so as to obtain a buffer read address.

12. A request buffer apparatus for controlling a plurality of requests to a plurality of memory banks to be accessed which are commonly used by a plurality of accessing devices in a data processing system, comprising:

request buffer means having a plurality of buffers for storing access requests to said memory banks;

buffer status circuit means, coupled to said request buffer means, for indicating an empty status of said plurality of buffers;

buffer write address generating means, coupled to said buffer status circuit means, for generating addresses of said buffers which are empty as buffer write addresses in accordance with contents of said buffer status circuit means;

buffer read address generating means, coupled to said request buffer means and said buffer write address generating means, arranged for each of said memory banks, for storing buffer write addresses of said buffers, for storing an access request corresponding to a memory bank, and for generating as a buffer read address to said request buffer means a write address of a buffer storing an access request which is stored first when a buffer read request is received; and, a control circuit, coupled to said buffer read address generating means and said request buffer means, for producing a buffer read request to said buffer read address generating means and a read command to said request buffer means, respectively, in accordance with a ready state of a memory bank.

13. A request buffer apparatus adapted to be coupled between a plurality of memory banks and a plurality of access devices, which controls memory access requests sent from said access devices, comprising:

latch register means for latching memory access requests that are sent from said access devices;

request buffer means, adapted to be coupled between said latch register means and a set of said memory banks, having a plurality of buffers, for storing said memory access requests;

request buffer control means, coupled to said request buffer means, for writing, in empty buffers among said buffers, memory access requests which are latched in said latch register means, for searching said buffers for a memory access request which designates a memory bank which is ready to receive a memory access request, and for reading such a memory access request;

direct data line means, adapted to be coupled between said latch register means and said memory banks, for directly connecting said latch register means with each of said memory banks;

direct output means, coupled to said latch register means and to said direct data line means, for directly supplying a memory access request, which is newly latched in said latch register means, through said direct data line means to a memory bank which is designated by said newly latched memory access request when no memory access request designating said memory bank designated by said newly latched memory access request is stored in said request buffer means when said memory bank designated by said newly latched memory access request is ready to receive a memory access request.

* * * * *